(12) United States Patent
Ertel

(10) Patent No.: US 9,550,428 B1
(45) Date of Patent: Jan. 24, 2017

(54) POSITIONING SYSTEM FOR ELECTRIC CHARGING

(71) Applicant: Proterra Inc., Greenville, SC (US)

(72) Inventor: Kevin William Ertel, Greenville, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 15/088,359

(22) Filed: Apr. 1, 2016

(51) Int. Cl.
  *B60L 11/18* (2006.01)

(52) U.S. Cl.
  CPC .................. *B60L 11/1835* (2013.01)

(58) Field of Classification Search
  CPC ................................... B60L 11/1835
  USPC ....................................... 320/109
  See application file for complete search history.

(56) References Cited

U.S. PATENT DOCUMENTS

2014/0070767 A1* 3/2014 Morris .................. B60L 5/42
  320/109

* cited by examiner

*Primary Examiner* — Edward Tso
*Assistant Examiner* — Ahmed Omar
(74) *Attorney, Agent, or Firm* — Bookoff McAndrews, PLLC

(57) ABSTRACT

A charging station for an electric vehicle having a charging blade may include a charge head configured to electrically connect with a charging blade of a vehicle to charge the vehicle, the charge head extending from a front end to a rear end along a longitudinal axis that extends along a direction of travel of the vehicle. The charge head may include a first housing and a second housing, wherein the first and second housings are (a) symmetrically positioned about the longitudinal axis and (b) separated by a channel that extends from the front end to the rear end of the charge head, the channel being dimensioned to position the charging blade therein. The charge head may further include one or more charging brushes located in each of the first housing and the second housing, wherein each of the one or more charging brushes in each housing is configured to extend into the channel towards the other housing to contact the charging blade positioned in the channel. The charge head may also include one or more sensors located in at least one of the first housing or the second housing, wherein the one or more sensors is configured to detect a presence of the charging blade in the channel.

20 Claims, 4 Drawing Sheets

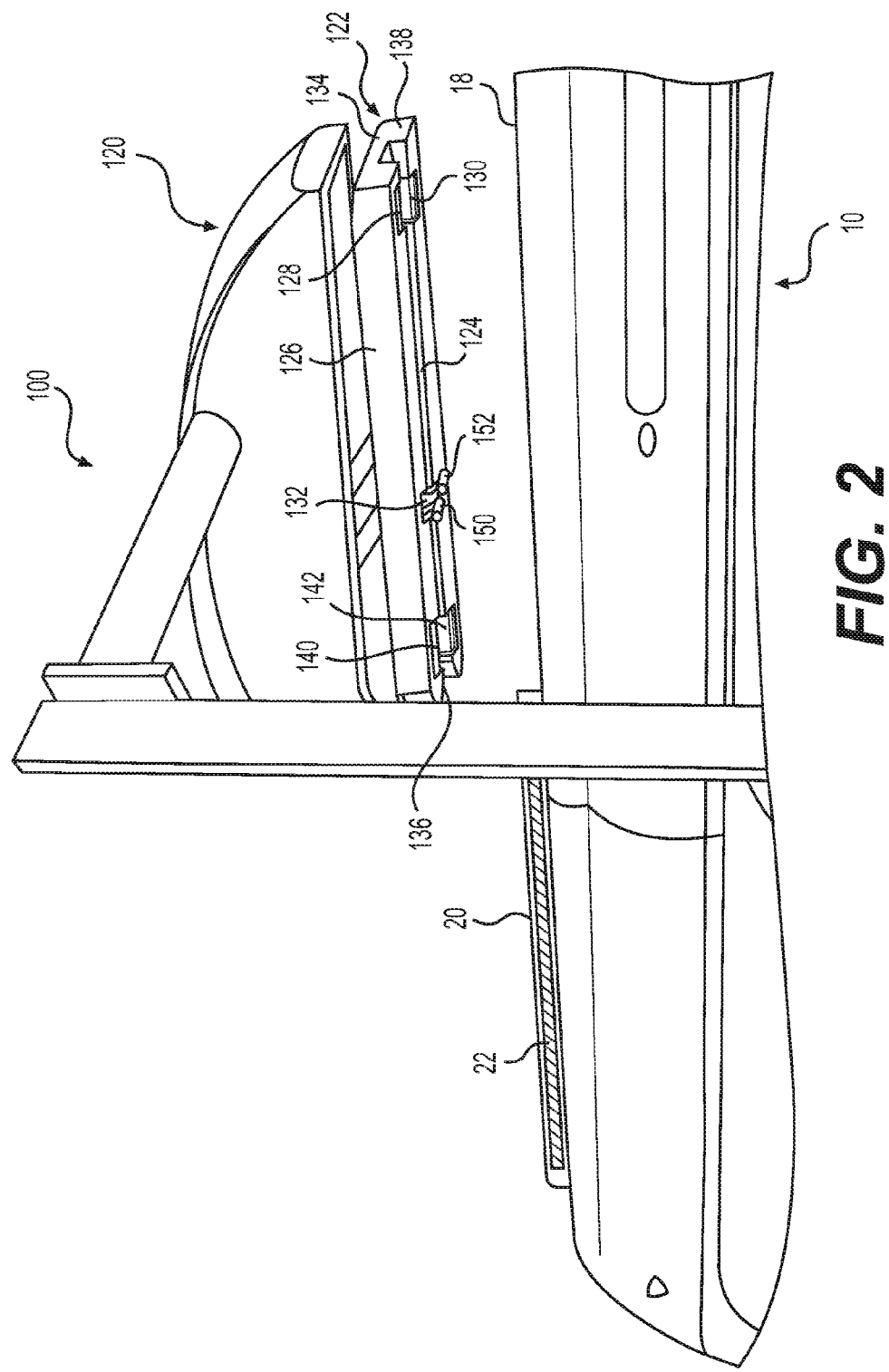

POSITIONING SYSTEM FOR ELECTRIC CHARGING

TECHNICAL FIELD

The current disclosure relates to systems and methods for assisting in determining the position of a vehicle for charging.

BACKGROUND

Electric vehicles, such as transit buses, are charged at a charging station. When a vehicle is positioned proximate to a charging station, a charging arm of the charging station automatically engages with a charging interface of the vehicle to charge the vehicle. For proper engagement of the charging arm and the charging interface, the vehicle should be correctly positioned at the charging station. In some applications, the driver of the vehicle manually aligns and positions the vehicle at the charging station by sight. Improper positioning of the vehicle at the charging station may cause misalignment of the charging interface with respect to the charging arm that could damage the charging arm or charging interface and/or could cause a delay in charging.

Embodiments of the current disclosure may alleviate the problems discussed above and/or other problems in the art. The scope of the current disclosure, however, is defined by the attached claims, and not by the ability to solve any specific problem.

SUMMARY

Embodiments of the present disclosure relate to systems and methods for aligning and/or positioning a vehicle using sensors. Each of the embodiments disclosed herein may include one or more of the features described in connection with any of the other disclosed embodiments.

In one embodiment, a charging station for an electric vehicle having a charging blade is disclosed. The charging station may include a charge head configured to electrically connect with the charging blade of the vehicle to charge the vehicle. The charge head may extend from a front end to a rear end along a longitudinal axis that extends along a direction of travel of the vehicle. The charge head may include a first housing and a second housing symmetrically positioned about the longitudinal axis. The first housing and the second housing may be separated by a channel that extends from the front end to the rear end of the charge head, the channel being dimensioned to position the charging blade therein. The charge head may further include one or more charging brushes located in each of the first housing and the second housing. Each of the one or more charging brushes in each housing may be configured to extend into the channel towards the other housing to contact the charging blade positioned in the channel. The charge head may also include one or more sensors located in at least one of the first housing and the second housing. The one or more sensors may be configured to detect a presence of the charging blade in the channel.

In another embodiment, a method of charging an electric vehicle at a charging station is disclosed. The electric vehicle may include a charging blade projecting outwards from an external surface of the vehicle and extending along a direction of travel of the vehicle, and the charging station may include a charge head that extends from a front end to a rear end of the charge head along a longitudinal axis. The charge head may include a first housing and a second housing, wherein the first and second housings are symmetrically positioned about the longitudinal axis and are separated by a channel that extends from the front end to the rear end of the charge head along the longitudinal axis. The channel may be dimensioned to position the charging blade therein. The method may include positioning the vehicle proximate to the charging station, moving the charge head to land on the external surface of the vehicle, and advancing the vehicle such that the charging blade enters the channel from the rear end of the charge head. The method may further include detecting that the charging blade is positioned in the channel using a sensor coupled to the charge head, extending one or more charging brushes from the first housing and the second housing of the charge head to contact the charging blade, and activating a current flow from the charge head to the vehicle to charge the vehicle.

In another embodiment, a charging system for an electric vehicle is disclosed. The system may include an electric vehicle having a charging interface positioned on a roof of the vehicle. The charging interface may comprise a charging blade projecting from the roof and extending along a direction of travel of the vehicle. The charging blade may include a plurality of electrodes. The system may also include a charging station comprising a charge head. The charge head may extend from a front end to a rear end along a longitudinal axis, and may include a first housing and a second housing symmetrically positioned about the longitudinal axis. The first and second housings may be separated from each other by a channel that extends from the front end to the rear end of the charge head along the longitudinal axis, wherein the channel is dimensioned to position the charging blade therein. The charge head may further include one or more charging brushes located in each of the first housing and the second housing, wherein the one or more charging brushes in each housing may be extendable towards the other housing and into the channel. The charge head may also include one or more sensors configured to detect the presence of the charging blade in the channel. The one or more sensors may each include an emitter and a receiver positioned on the first housing and a reflector positioned on the second housing.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIG. 2 illustrates a partial view of the bus and charging station of FIG. 1;

DETAILED DESCRIPTION

The present disclosure describes systems and methods for aligning and/or positioning an electric vehicle for charging. While principles of the current disclosure are described with reference to aligning/positioning an electric bus at an overhanging charging station, it should be understood that the disclosure is not limited thereto. For example, the systems and methods of the present disclosure may be used to align or position any type of vehicle (motorcycle, trains, cars, plane, etc.) at any type of charging station.

Figure 1:
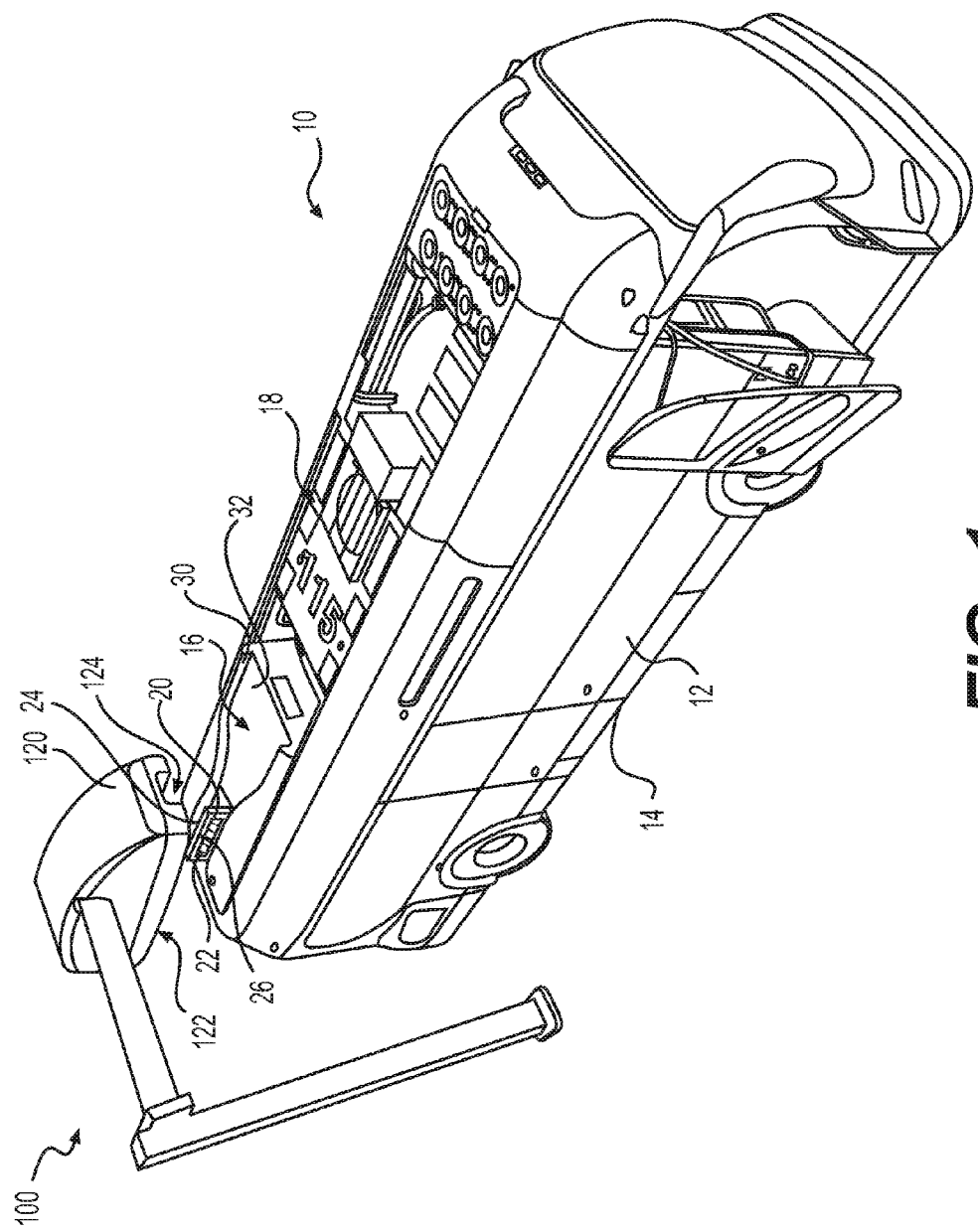
FIG. 1 illustrates an exemplary electric bus and charging station of the current disclosure.

FIG. 1 illustrates an electric vehicle in the form of an electric transit bus 10. Electric bus 10 may include a body 12 enclosing a space for passengers. In some embodiments, some (or all) parts of body 12 may be fabricated using composite materials to reduce the weight of the bus 10. Without limitation, the body 12 of the bus 10 may have any size, shape, and configuration.

The bus 10 may be propelled by an electric motor, and/or may have other electrically-powered functions, such as, for example, vehicle air conditioning, electric lighting and/or doors. A battery system 14 may store electrical energy to power the motor and the other electrical components. In some embodiments, the battery system 14 may be positioned under the floor of the bus 10, and may be configured as a plurality of battery packs. These battery packs may be positioned in cavities (not shown) located under the floor of the bus 10, and may be accessible from below the bus 10. The batteries of battery system 14 may have any chemistry and construction. In some embodiments, the batteries may be lithium titanate batteries or nickel manganese cobalt batteries. In some embodiments, the layout and design of the battery system 14 may enable fast charging of the batteries. By fast charging, the battery system 14 may be recharged (to greater than about 95% state of charge) in less than or equal to about 10 minutes. As used herein, the terms "about" and "approximately" provide for variations of ±5% of the stated value.

The bus 10 may be a transit bus that operates along a fixed route in a geographic area (city, town, airport, campus, etc.). Bus 10 may continuously travel on a route picking up and dropping off passengers at several bus stops along the route. One or more charging stations 100, each having a charge head assembly 120, may be located along the route to charge the buses 10. Some of these charging stations 100 may be located at bus stops. Bus 10 may be recharged while passengers embark and disembark at a bus stop.

A charging interface 16 may be provided on a roof 18 of the bus 10 to charge the battery system 14. The charging interface 16 may include components that interface with the charge head assembly 120 of the external charging station 100 to charge the battery system 14. The charging interface 16 may include a charging blade 20 and a funnel-shaped alignment scoop 30. The charging blade 20 may include one or more electrodes 22, 24 that are electrically coupled to the battery system 14. In some embodiments, the one or more electrodes may include electrodes 22 and electrodes 24 positioned on opposite side surfaces of the charging blade 20 and/or one or more electrodes 26 positioned on a top surface of the charging blade 20. An exemplary embodiment of the charging blade 20 is described in commonly-assigned U.S. Patent Application Publication No. 2014/0070767, which is incorporated by reference in its entirety herein. To charge the bus, when bus 10 is positioned under the charge head assembly 120 of charging station 100, a vertically and/or horizontally moveable charge head 122 of the charge head assembly 120 may descend to land on a landing zone 32 of the charging interface 16.

Figure 3A:
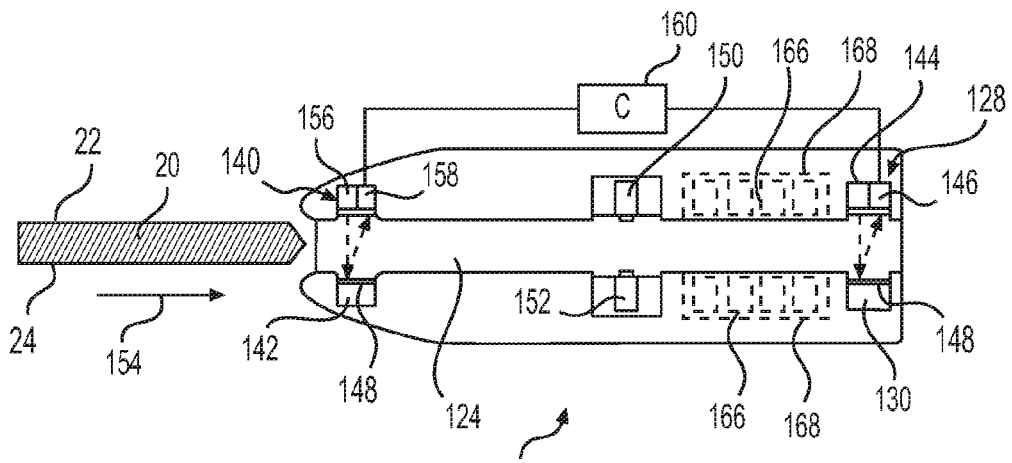
FIGS. 3A-3C schematically illustrate steps in an exemplary method of suitably positioning the bus of FIG. 1 for charging at a charging station.
Figure 3B:
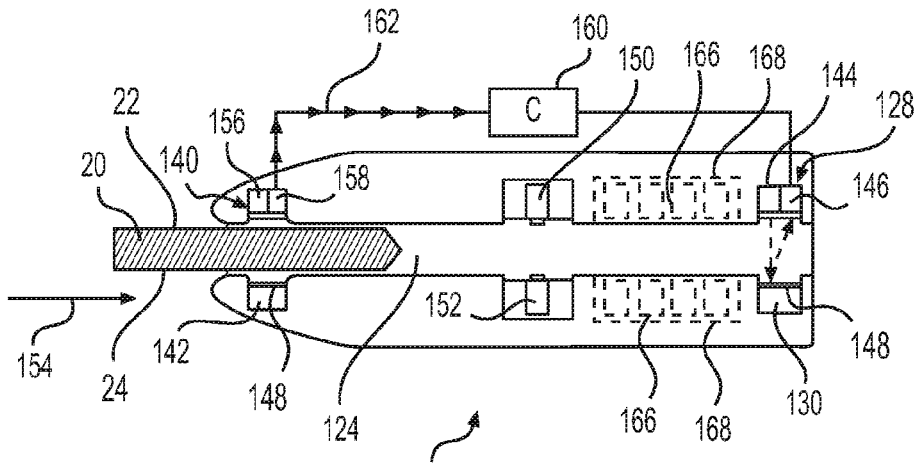
Figure 3C:
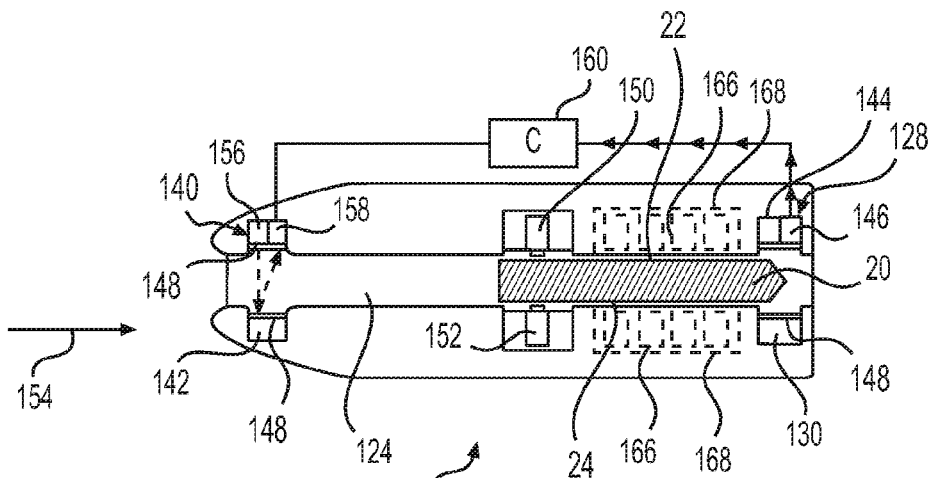

With the charge head 122 on the landing zone 32, the bus 10 may be moved forward to align electrodes of the charge head 122 with electrodes on the blade 20 (as shown in FIGS. 3A-3C). The electrodes of the charge head 122 may be located within a channel 124 extending the length of the charge head 122 (see FIGS. 3A-3C). The alignment scoop 30 may include a pair of side rails (wall or other features) that extend along a portion of the length of the bus on either side of the blade 20. The pair of rails may be arranged such that they are spaced further apart (wider portion) at the front (relative to the direction of bus travel) than at the rear (narrower portion) to have a funnel-shaped configuration. As the bus moves forward, the funnel-shaped alignment scoop 30 may direct the lowered charge head 122 resting on the landing zone 32 towards the charging blade 20 positioned between the rails in the narrower portion. The funnel shape of the alignment scoop 30 and the lateral play of the charge head 122 enable the charging system to tolerate some amount of lateral misalignment between the charge head assembly 120 of charging station 100 and the charging interface 16 of the bus 10. The funnel shape of the alignment scoop 30 may direct the charge head 122 to be positioned such that the charging blade 20 is aligned with the channel 124 and may pass into the channel 124 upon forward movement of the bus 10.

FIG. 2 illustrates a partial view of a charging station 100 with a charge head assembly 120 positioned above the roof 18 of bus 10. The charging station 100 may be coupled to an electric grid that is supplied with energy (electricity) by a utility company. Single phase or three-phase AC current from the electrical grid may be converted into DC current and directed into the charge head assembly 120. In general, the charge head assembly 120 may be configured to overhang the roof 18 of a vehicle, such as a bus 10. In some embodiments, as illustrated in FIGS. 1 and 2, the charge head assembly 120 may be connected to a cantilever arm that is connected to a post fixed to the ground. However, other configurations are also possible. For example, in some embodiments, the cantilever arm may extend sideways from the side of a building, or the charge head assembly 120 may extend downwards from a roof that extends over the road surface. The charge head assembly 120 may have a domed shape, as depicted in FIGS. 1 and 2, or may be, for example, a rectangular prism or a hemisphere. One of ordinary skill in the art will understand that a variety of other regular or irregular shapes are suitable for the charge head assembly 120.

The charge head 122 may be positioned in the charge head assembly 120. The charge head 122 may be configured to extend from (i.e., move vertically down from, etc.) the charge head assembly 120 towards the roof 18 of the bus 10 positioned below the charge head assembly 120. FIG. 2 illustrates the charge head 122 in a partially lowered, deployed position. In some embodiments, the charge head 122 may be located generally at the bottom of the charge head assembly 120. The charge head 122 may be horizontally and/or vertically movable independently from the rest of the charge head assembly 120. Such movability may be powered by an electrical current, or may be mechanically caused by external force from, for example, rails of an alignment scoop 30 of a charging interface 16 on a bus 10 (pictured in FIG. 1). The charge head 122 may have a front end 134 and a rear end 136. A channel 124 may be formed by a gap between two charge head boats 126, 138, extending from the front end 134 to the rear end 136. The charge head boats 126, 138 of the charge head 122 may generally be boat-shaped, and may run the entire length of the charge head. The charge head assembly 120, charge head 122 and charge head boats 126, 138 may be constructed out of one or more weather-resistant, durable materials, such as Delrin®. The charge head boats 126, 138 may be constructed out of a single contiguous piece of material forming the charge head 122, or may be separate structures affixed to a third structure to form the charge head 122. The charge head boats 126, 130 may optionally include one or more cavities 132 that may house vertically moveable switches 150, 152. In some embodiments, cavities 132 may be positioned on a bottom surface (i.e., the surface that faces the roof 18 of the bus 10 positioned below) of the charge head 122, and the switches 150, 152 may extend from the cavities 132 towards the roof 18 of the bus 10. Exemplary embodiments of a charge head 122 are described in commonly-assigned U.S. application Ser. No. 14/980,637, filed Dec. 28, 2015, which is incorporated by reference in its entirety herein.

The channel 124 of the charge head 122 may be formed by a gap between the two charge head boats 126, 138. The channel 124 may generally run from near the front end 134 of the charge head 122 to the rear end 136 of the charge head 122. The channel 124 may be of a width that accommodates the charging blade 20 of bus 10, and may be sized to allow electrodes (see FIGS. 3A-3C) in the charge head 122 to move into engagement with electrodes (not shown) in the charging blade 20. The channel 124 may have a generally rectangular shape, or may be any other shape that accommodates the charging blade 20 of bus 10.

Sensors 128, 140 may be located in the first charge head boat 126 such that they are adjacent to the channel 124, and corresponding reflectors 130, 142 may be located in the second charge head boat 138 such that they are also adjacent to the channel 124, and directly across from sensors 128, 140 respectively. One or more cavities 132 may be located on the underside of the charge head boats 126, 138. Vertically displaceable switches 150, 152 may hang from within the cavities 132, such that when the charge head 122 is lowered, the switches 150, 152 may contact the charging interface 16 of the bus 10 (depicted in FIG. 1) and may be pushed upwards by the contact. Upon being pushed upward, the switches 150, 152 may be configured to transmit a wired or wireless signal indicating that they have been pushed upward. Such a signal may indicate, for example, that the charge head 122 has landed on the roof 18 of the bus 10, the charge head 122 is lowered to an appropriate height, and/or that the bus 10 should slow to a desired speed. Without limitation, any number of switches and cavities may be provided in the charge head boats 126, 138.

The charge head 122 may also include electrodes to engage with electrodes in the charging blade 20 (of the bus 10) and direct power from the charge head assembly 120 to the battery system 14 (see FIG. 1) of the bus 10. Such electrodes in the charge head 122 may be, for example, extendable charge head brushes 166 located in recesses 168 within the charge head boats 126, 138 adjacent to the channel 124 (see, for example, FIGS. 3A-3C), such that they can extend into the channel 124 and contact the charging blade 20. Exemplary embodiments of such electrodes are described in U.S. Patent Application Publication No. 2014/0070767 and U.S. application Ser. No. 14/980,637 which are incorporated by reference in its entirety herein. These brushes 166 may have any shape and size, and may be made of any electrically conductive material. In some embodiments, the brushes 166 may be made of carbon impregnated with copper particles. In general, each charge head boat 126, 138 may include any number (one, two, six, etc.) of electrodes (such as brushes 166). In some embodiments, each boat 126, 138 may include the same number of electrodes. Although the electrodes are described as being extendable, it is also contemplated that, in some embodiments, spring loaded electrodes may be used. That is, the electrodes may be spring loaded to be biased in an extended configuration. And, as the charging blade 20 squeezes through the space between the electrodes in the channel 124, it may force at least a portion of the electrodes to retract into their respective recesses 168 and apply a reaction force against the blade 20.

FIGS. 3A-3C illustrate, in schematic form, a bottom-up view of the charge head 122 of FIG. 2 and steps in an exemplary method of using the charge head 122 and charging blade 20 depicted in FIG. 2 and described herein. As depicted in FIGS. 3A-3C, one or more sensors 140, 128 may be located on the charge head boat 126. Although two sensors 140, 128 are illustrated in FIGS. 3A-3C, in general, any number of sensors may be provided on the charge head 122. These sensors may be of any type (e.g., proximity sensor, retroreflective sensor, through-beam sensor, photoelectric sensor, ultrasonic sensor, laser distance sensor, RFID antenna, etc.) and may function in any manner (inductive, optical, capacitive, magnetic, etc.). In some embodiments, one or both of the sensors 140, 128 may be optical sensors may each include an emitter (156 and 144, respectively) and a receiver (158 and 146, respectively). The emitters 156, 144 may be configured and positioned to each emit a beam, such as a light (laser, etc.) beam, towards the reflectors 142 and 130 respectively. The reflectors 142, 130, positioned across the channel 124 on charge head boat 138, may be positioned and configured to each reflect the beam originating from the emitters 156, 144 towards the receivers 158 and 146 respectively, when the area of the channel 124 between the sensors 140, 128 and the reflectors 142, 130 is unobstructed. The receivers 158, 146 may be configured to each receive a beam originating from the emitters 156, 144 and reflecting off of the reflectors 142, 130. The receivers 158, 146 may further be configured to send a wired or wireless signal should their reception of a beam be interrupted by, for example, the charging blade 20 of a bus 10. Such a signal may be sent to a remote receiving center 160 (e.g., a control system), which may be on the bus 10, the bus stop, a remotely located bus control center, or other location.

In some embodiments, the sensors 140, 128 and/or the reflectors 142, 130 may be installed behind a transparent or partially transparent protective material 148. The protective material 148 may be a clear, durable, scratch-resistant material, such as, for example, plexiglass. Further, the sensors 140 128, reflectors 142, 130, and/or protective material 148 may be slightly recessed into the charge head boats 126, 138 along the channel 124 and/or along the bottom of the charge head 122. Such a recessed position may prevent the sensor, reflector and/or protective material from being damaged by contact with various parts of a bus 10. For example, in some embodiments, the side of the protective material 148 facing the channel 124 may be recessed back from the side of the charge head boat facing the channel 124 by a distance of between about 1-10 millimeters (e.g., about 2 millimeters). This recessing distance may be larger or smaller, as will be evident to one of ordinary skill in the art.

To charge the bus 10 at the charging station 100, the bus 10 is driven up the charging station 100 and positioned such that the roof 18 of the bus is under the overhanging charging assembly 120. When the bus 10 is suitably positioned under the charging assembly 120, the charge head 122 may descend and land on the landing zone 32 of the roof 18. In some embodiments, RFID tags and readers on charging assembly 120 and the roof 18 may indicate the location of the charging interface 16 with respect to the charging assembly 120. When the charge head 122 lands on the roof 18, switches 150, 152 may indicate (to, e.g., a control system) that the charge head 122 has landed on the landing zone 32. With the charge head 122 resting on the roof 18, the bus 10 may be moved forward to engage the charge head 122 with the charging blade 20. As the bus 10 moves forward, the charge head 122 may slide on the roof 18 towards the charging blade 20. While sliding, the rails of the funnel-shaped alignment scoop 30 may align (i.e., push, etc.) the head 122 with the blade 20 positioned between the narrow portion of the rails (towards the rear of the bus 10). As the charge head 122 slides along this narrow portion, the channel 124 of the charge head 122 becomes aligned with the blade 20. Upon further movement of the bus 10, the front end of the blade 20 enters the center channel 124 at the rear end 136 of the charge head 122. In some embodiments, the front end of the blade 20 is tapered (see FIGS. 3A-3C) and the width of the channel 124 at the rear end 136 is wider (than the rest of the channel 124) to ease the blade 20 into the channel 124. As the bus 10 continues to move forward, the blade 20 moves in the channel 124 and its presence may be detected by the sensors 140, 128.

FIG. 3A depicts a schematic of a bottom-up view of the charge head 122 and the charging blade 20 of the bus 10, prior to the bus 10 advancing in a forward direction 154 and causing the charging blade 20 to enter the channel 124. Two sensors are shown as a first paired emitter 156 and receiver 158 and a second paired emitter 144 and receiver 146. The two emitters 156, 144 may emit beams to reflectors 142, 130 respectively. The reflectors 142, 130, located across channel 124 from emitters 156, 144 respectively, may reflect the beams back to receivers 158, 146, respectively. FIG. 3B depicts a schematic of a bottom-up view of the charge head 122 and the charging blade 20 as the bus advances in a forward direction 154 and causes the charging blade to enter the channel 124, and come between the emitter 156 and reflector 142. A beam emitted by emitter 156, located near the point of entry of charging blade 20 into the channel 124, may be obstructed by the charging blade 20, such that no beam is reflected by the reflector 142 or received by the receiver 158. Upon loss of reception of a beam, the receiver 158 may send a wired or wireless signal 162 to the local or remote receiving center 160. FIG. 3C depicts a schematic of a bottom-up view of the charge head 122 and the charging blade 20 as the bus advances further in the forward direction 154. The charging blade 20 may cease to interrupt the beam from emitter 156 to reflector 142 and receiver 158. A beam emitted by emitter 144, located near the point of exit of the charging blade 20 from the channel 124, may become interrupted by the advancing charging blade 20, such that no beam is reflected by reflector 130 or received by the receiver 146. Upon interruption of a beam, the receiver 146 may send a wired or wireless signal 164 to the receiving center 160.

Figure 4:
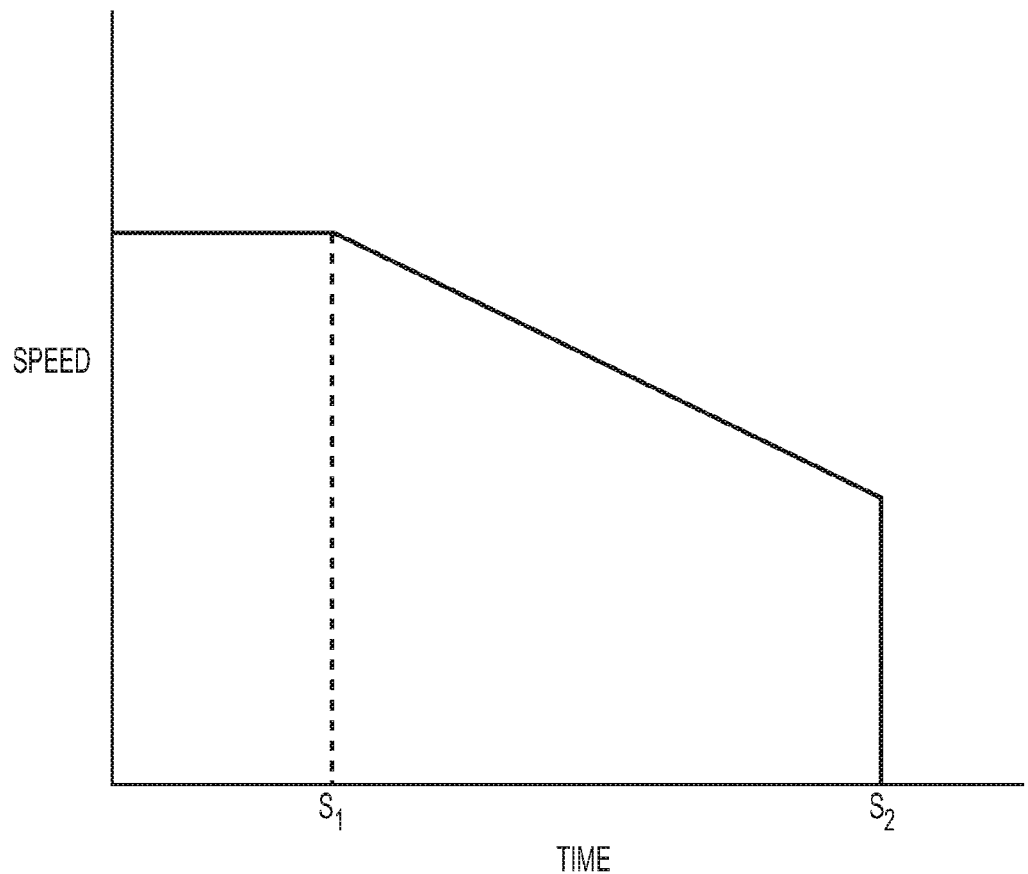
FIG. 4 graphically illustrates an exemplary deceleration curve of the bus of FIG. 1 as it is being positioned at the charging station for charging.

FIG. 4 illustrates, in graph form, an exemplary deceleration curve for a bus 10 as its charging blade 20 advances into the channel 124 of the charge head 122. The bus is traveling at a first speed as the charging blade 20 enters the channel 124. As the charging blade 20 interrupts the beam from emitter 156 to reflector 142 and receiver 158 at a time $S_1$, the receiver 158 may send a signal to a control center 160, the bus 10, and/or a driver of the bus 10 to decelerate the bus 10. As the charging blade 20 interrupts the beam from emitter 144 to reflector 130 and receiver 146 at time $S_2$, the receiver 146 may send a signal to the control center 160, the bus 10, and/or a driver of the bus 10 to stop the bus, thus causing the bus to be stopped in the desired position.

In some embodiments, the sensors 128, 140 and reflectors 130, 142 may be used in conjunction with the vertically displaceable switches 150, 152 (depicted in FIGS. 2 and 3A-3C) and the alignment scoop 32 (depicted in FIG. 1) in order to correctly position the charging blade 20 within the channel 124 both vertically and horizontally prior to actuation of a charging cycle. For example, as the charge head 122 lowers onto the charging interface 16 of the bus 10, the switches 150, 152 may be pushed vertically upwards (or may rotate) into the cavities 132 of the charge head boats 126, 148. Upon being pushed upwards by a predetermined distance that indicates that the charge head 122 is in the correct vertical position, the switches 150, 152 may send a wired or wireless signal to a remote operator or center to indicate that the charge head is correctly vertically placed. The switches 150, 152 may also actuate the emitters 156, 144 of the sensors 140, 128 to begin emitting beams towards reflectors 142, 130 respectively. As has been previously described, the alignment scoop 32 (see FIG. 1) may guide the charge head 122 to the correct position such that the channel 124 is aligned with the charging blade 20 on the bus 10. Finally, and as described above, the bus may advance such that the charge head blade 20 enters the channel 124, and one or more sensors 140, 128 in the charge head boats 126, 138 and adjacent to the channel 124 may assist in determining the point at which electrodes on the charging blade 20 are aligned with a plurality of charge head brushes 166 located in recesses 168 in the charge head boats 126, 138. Upon the charging blade 20 reaching the desired position in the channel 124, the charge head brushes 166 may automatically extend out of the recesses 168 into the channel 124 to contact electrodes (not shown) on the charging blade 20. In some embodiments, the charge head brushes 166 may, for example, be pneumatically activated to extend out of the charge head boats 126, 138. Once contact is established between the charge head brushes 166 and the charging blade 20, a charging cycle may be actuated and the bus 10 may be charged.

The retroreflective sensors depicted in FIGS. 2 and 3 are exemplary, and other sensors known in the art may be appropriate for use in the charge head boats 126 and/or 138, to assist in determining whether the charge head blade 20 of a bus 10 is positioned between the front end 134 and the rear end 136 of the charge head 122 such that electrodes on the charge head blade 20 are aligned with charge head brushes 166 in the charge head boats 126, 138. For example, in one alternative aspect, the charge head boats may be equipped with one or more proximity sensors, such as inductive proximity sensors. In such an aspect, the charging blade 20 of the bus 10 may be made wholly or partly from a ferrous material, or a ferrous material may be attached to the charging blade 20 of the bus 10, such that the one or more inductive proximity sensors may sense the presence of the charging blade 20 as it advances through the channel 124.

In a further alternative aspect, the charge head boats may be equipped with one or more through beam sensors. In such an aspect, each sensor may consist of an emitter located on one charge head boat (either 126 or 138) and a receiver located on the other charge head boat, opposite the emitter. The emitter of each sensor may be configured to emit a beam (such as, for example, an optical beam) to the corresponding receiver on the opposite charge head boat. As the charging blade 20 of the bus 10 passes through the channel 124, the beam may become interrupted, indicating that the charging blade 20 is in the channel 124.

In yet another alternative aspect, the charge head boats may be equipped with one or more photoelectric sensors and/or ultrasonic sensors. In such an alternative aspect, each sensor may consist of a single sensor module located on a charge head boat. Each sensor may be configured to detect an object within its detection range in the channel 124, such as the charging blade 20.

In yet another alternative aspect, the charge head boats may be equipped with one or more laser distance sensors. In such an aspect, each laser distance sensor may be configured to measure the distance between itself on one charge head boat and an object in a given direction, such as the direction from the charge head boat across the channel 124. The presence of the charging blade 20 may be detected upon the measured distance dropping below a predetermined threshold (e.g., dropping below the predetermined distance between the charge head boats to a smaller distance from the charge head boat housing the sensor to the charging blade 20 as the charging blade 20 enters the channel 124 between the laser distance sensor in one charge head boat and the opposite charge head boat).

In another alternative aspect, the charge head boats may be equipped with one or more RFID antennae. In such an alternative aspect, the charging blade 20 of the bus 10 may be equipped with one or more RFID tags, such that the one or more RFID antennae may register the presence of the one or more RFID tags as the charging blade 20 passes through the channel 124. One of ordinary skill in the art will appreciate that a variety of other known sensors, or combinations of the above sensors and/or other known sensors, will be useable in this invention.

While FIG. 2 depicts two retroreflective sensors (128 and 140), each paired with a corresponding reflector (130 and 142, respectively); in alternate embodiments, a single sensor or sensor/reflector pair, or three or more sensors or sensor/reflector pairs may be used. In one alternative aspect, only a single retroreflective sensor 128 may be used to properly align the bus 10. In this arrangement, the single retroreflective sensor 128 and paired reflector 130 may be located across the channel 124 from one another near the rear end 136 of the charge head 122. In such an embodiment, upon a charge head blade 20 entering the channel 124 and obstructing the space in between the sensor 128 and the reflector 130, the sensor 128 may send a signal (such as the signal 162 depicted in FIG. 3B) to a receiving center (such as the receiving center 160 depicted in FIGS. 3A-3C), indicating that the charge head blade 20 of the bus has entered the channel 124 of the charge head 122. Upon receiving this signal, the receiving center may provide a visible or audible signal to, for example, the driver of the bus 10 or an automatic drive system in the bus 10, to indicate that the bus 10 should advance slowly. In this embodiment, the bus 10 may be equipped with a mechanism to track the distance traveled by the bus as it advances slowly (either automatically or manually), causing the charge head blade 20 to enter further into the channel 124. Such a distance-tracking mechanism may be, for example, a wheel rotation counter on the bus 10. Once the distance-tracking mechanism has measured that the bus 10 has moved forward by a predetermined distance between the rear end 136 and front end 134 of the charge head 122, the bus may be stopped automatically or manually. The predetermined distance between the rear end 136 and front end 134 of the charge head 122 may be configured such that that after the bus travels the predetermined distance and stops, the charge head blade 20 of the bus 10 is located within the channel 124 such that charge head brushes 166 may extend from the charge head 122 into the channel 124 and engage with electrodes on the charge head blade 20 and actuate charging of the bus 10.

In another alternative aspect, only a single paired retroreflective sensor and reflector may be used to position the bus 10, and the single paired retroreflective sensor and reflector may be located across the channel 124 from one another near the front end 134 of the charge head 122. In such an aspect, upon a charge head blade 20 moving through the channel 124 and obstructing the space in between the sensor and the reflector, the sensor may send a signal (such as the signal 164 depicted in FIG. 3C) to a receiving center (such as the receiving center 160 depicted in FIGS. 3A-3C), indicating that the charge head blade 20 of the bus has neared the front end 134 of the charge head 122, and the bus 10 should stop. Upon receiving this signal, the receiving center may provide a signal to, for example, the driver of the bus 10 or an automatic drive system in the bus 10, to indicate that the bus 10 should stop. The location of the charging blade 20 in the channel 124 at the stopping point may be such that electrodes from the charge head 122, extending into the channel 124, may engage with electrodes on the charge head blade 20 and actuate charging of the bus 10. In this aspect, prior to the charge head blade 20 moving through the channel 124, the charge head 122 may lower onto the roof of bus 10, causing vertically displaceable 150, 152 (depicted in FIGS. 2 and 3A-3C) to be pushed upwards. The switches 150, 152 may provide a signal to, for example, the driver of the bus 10 or an automatic drive system in the bus 10 to indicate that the bus 10 should move forward at a slow speed.

In any of the above embodiments and aspects, other sensors known in the art may be used in place of retroreflective sensors and paired reflectors. A sensor or sensors may be additionally or alternately located on or in a roof portion 170 of the charge head 122 (see FIG. 3). A sensor or sensors may be additionally or alternately located on the underside of the charge head boats 126, 138. In such embodiments and aspects, the charging interface 16 of the bus 10 may be equipped with one or more receivers, reflectors and/or tags (e.g., RFID tags) to interact with the sensor or sensors on the underside of the charge head boats 126, 138. Additionally, in any of the above embodiments and aspects, movement of the bus 10 may be completely automated upon the vertically displaceable switches 150, 152 being pushed upwards by the lowering of the charge head 122.

Other embodiments of the present disclosure will be apparent to those skilled in the art from consideration of the specification and practice of the embodiments disclosed herein. While various examples provided herein illustrate specific types of systems and methods, one of ordinary skill in the art will recognize that other configurations of a vehicle positioning and charging system, and variations upon the methods described, also may be used. Further, any features of an embodiment disclosed herein may incorporated into any other embodiment.

I claim:

1. A charging station for an electric vehicle having a charging blade, comprising:
   a charge head configured to electrically connect with a charging blade of a vehicle to charge the vehicle, the charge head extending from a front end to a rear end along a longitudinal axis that extends along a direction of travel of the vehicle, the charge head including:
   a first housing and a second housing, wherein the first and second housings are (a) symmetrically positioned about the longitudinal axis and (b) separated by a channel that extends from the front end to the rear end of the charge head, the channel being dimensioned to position the charging blade therein;

one or more charging brushes located in each of the first housing and the second housing, wherein each of the one or more charging brushes in each housing is configured to extend into the channel towards the other housing to contact the charging blade positioned in the channel; and a first sensor located in at least one of the first housing or the second housing proximate the rear end of the charge head, and a second sensor located in at least one of the first housing or the second housing proximate the front end of the charge head, wherein the first sensor is configured to detect entry of the charging blade into the channel, and the second sensor is configured to detect that the charging blade is positioned between the one or more charging brushes of the first housing and the second housing.

2. The system of claim 1, further including a control system adapted to receive a first signal from the first sensor indicating entry of the charging blade into the channel and a second signal from the second sensor indicating that the charging blade is positioned between the one or more charging brushes of the first housing and the second housing.

3. The system of claim 2, wherein the control system is located either on the electric vehicle or at a remote vehicle control center.

4. The system of claim 1, wherein the first and second sensors are fully recessed in at least one of the first housing or the second housing.

5. The system of claim 1, wherein the first sensor and the second sensor each includes:

an emitter and a receiver located in one of the first housing or the second housing; and a reflector located across the channel in the opposite housing, wherein each of the first and second sensors is configured to emit a sensor beam from the emitter to the reflector, receive a reflected beam at the receiver, and send a signal to a control system when the path of the sensor beam from the emitter to the reflector is interrupted.

6. The system of claim 1, wherein the charge head is configured to be movable relative to the vehicle.

7. The system of claim 1, wherein the charge head further includes one or more switches located on the underside of at least one of the first housing and the second housing.

8. The system of claim 7, wherein the one or more switches are configured to be actuated upon the charge head contacting a surface of the vehicle.

9. The system of claim 1, wherein the channel is wider at the front end than at the rear end.

10. A method of charging an electric vehicle at a charging station, the electric vehicle including a charging blade projecting outwards from an external surface of the vehicle and extending along a direction of travel of the vehicle, and the charging station including a charge head that extends from a front end to a rear end of the charge head along a longitudinal axis and includes a first housing and a second housing, wherein the first and second housings are (a) symmetrically positioned about the longitudinal axis and (b) separated by a channel that extends from the front end to the rear end of the charge head along the longitudinal axis, and wherein the first housing and the second housing each include one or more charging brushes that are configured to contact and direct power to the charging blade, the method comprising:

positioning the vehicle proximate to the charging station;
moving the charge head to land on the external surface of the vehicle;
advancing the vehicle such that the charging blade enters the channel from the rear end of the charge head;
receiving a first signal from a first sensor indicating that the charging blade has entered the channel, wherein the first sensor is coupled to at least one of the first housing or the second housing and is positioned at a location proximate the rear end of the charge head;
receiving a second signal from a second sensor indicating that the charging blade is positioned between the charging brushes of the first housing and the second housing;
stopping the vehicle in response to receiving of the second signal;
extending the charging brushes from the first housing and the second housing of the charge head to contact the charging blade; and
activating a current flow from the charge head to the vehicle to charge the vehicle.

11. The method of claim 10, wherein the external surface of the vehicle is a roof of the vehicle, and moving the charge head includes lowering the charge head to land on the roof.

12. The method of claim 10, further including advancing the vehicle further by a predetermined distance in response to receiving the first signal.

13. The method of claim 12, wherein advancing the vehicle further by a predetermined distance comprises advancing the vehicle such that a wheel of the vehicle completes a predetermined number of rotations.

14. The method of claim 10, wherein the first sensor and the second sensor are fully recessed in at least one of the first housing or the second housing.

15. A charging system for an electric vehicle, comprising:

an electric vehicle having a charging interface positioned on a roof of the vehicle, the charging interface comprising a charging blade projecting from the roof and extending along a direction of travel of the vehicle, the charging blade including a plurality of electrodes;

a charging station comprising a charge head extending from a front end to a rear end along a longitudinal axis, the charge head including:

a first housing and a second housing symmetrically positioned about the longitudinal axis and separated from each other by a channel that extends from the front end to the rear end of the charge head along the longitudinal axis, wherein the channel is dimensioned to position the charging blade therein;

one or more charging brushes located in each of the first housing and the second housing, wherein the one or more charging brushes in each housing is extendable towards the other housing and into the channel;

a first sensor located in the first and second housings proximate the rear end of the charge head; and a second sensor located in the first and second housings proximate the front end of the charge head, wherein the first sensor is configured to detect entry of the charging blade into the channel, the second sensor is configured to detect that the charging blade is positioned between the one or more charging brushes of the first housing and the second housing, and each of the first and second sensors includes an emitter positioned on one of the first housing or the second housing and a reflector positioned on the opposite housing across the channel.

16. The system of claim 15, further including a control system adapted to receive a first signal from the first sensor indicating entry of the charging blade into the channel and a second signal from the second sensor indicating that the charging blade is positioned between the one or more charging brushes of the first housing and the second housing.

17. The system of claim 15, wherein the first and second sensors are fully recessed in the first and second housings.

18. The system of claim 17, wherein the electric vehicle is a bus, and the charge head is configured to descend and land on the roof of the bus to engage with the charging blade.

19. The system of claim 16, wherein the control system is located on the electric vehicle, and wherein the control system is further adapted to display an indicator that the electric vehicle should decelerate upon receipt of the first signal, and display an indicator that the electric vehicle should stop upon receipt of the second signal.

20. The method of claim 10, wherein the first sensor and the second sensor include an emitter positioned on one of the first housing or the second housing and a reflector positioned on the opposite housing across the channel.

\* \* \* \* \*